W. H. VICK.
JOINTS FOR GAS, WATER, AND STEAM PIPES.

No. 174,035. Patented Feb. 22, 1876.

Witnesses:
Will W. Dodge
Donn Twitchell

Inventor:
W. H. Vick
by Dodge & Son,
his Attys.

UNITED STATES PATENT OFFICE.

WILLIAM H. VICK, OF ROCHESTER, NEW YORK.

IMPROVEMENT IN JOINTS FOR GAS, WATER, AND STEAM PIPES.

Specification forming part of Letters Patent No. 174,035, dated February 22, 1876; application filed December 21, 1875.

*To all whom it may concern:*

Be it known that I, WILLIAM H. VICK, of Rochester, in the county of Monroe and State of New York, have invented certain Improvements in Joints for Water, Gas, and Steam Pipes, of which the following is a specification:

My invention consists of a joint for pipes such as are ordinarily used for water, gas, steam, and the like, either for heating purposes or as a main, said joint being constructed as hereinafter more fully described.

Figure 1:
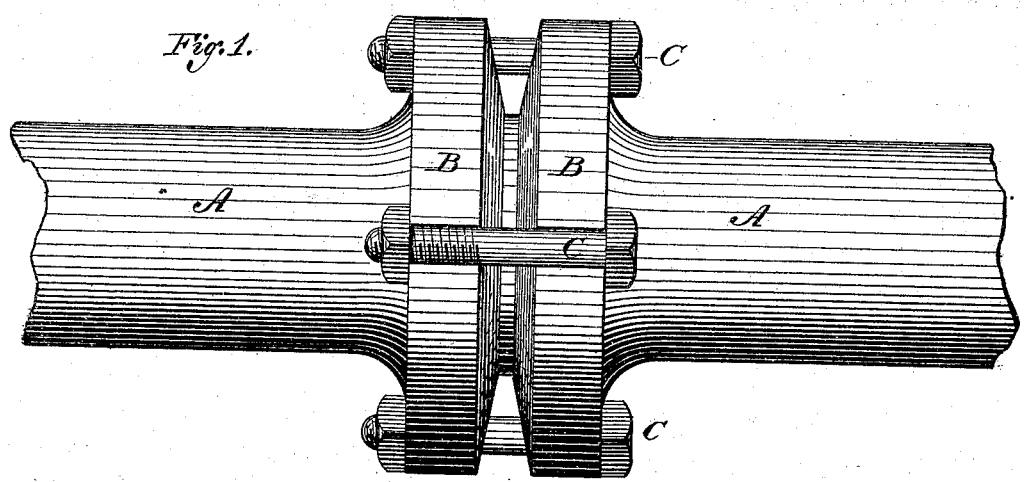
Figure 2:
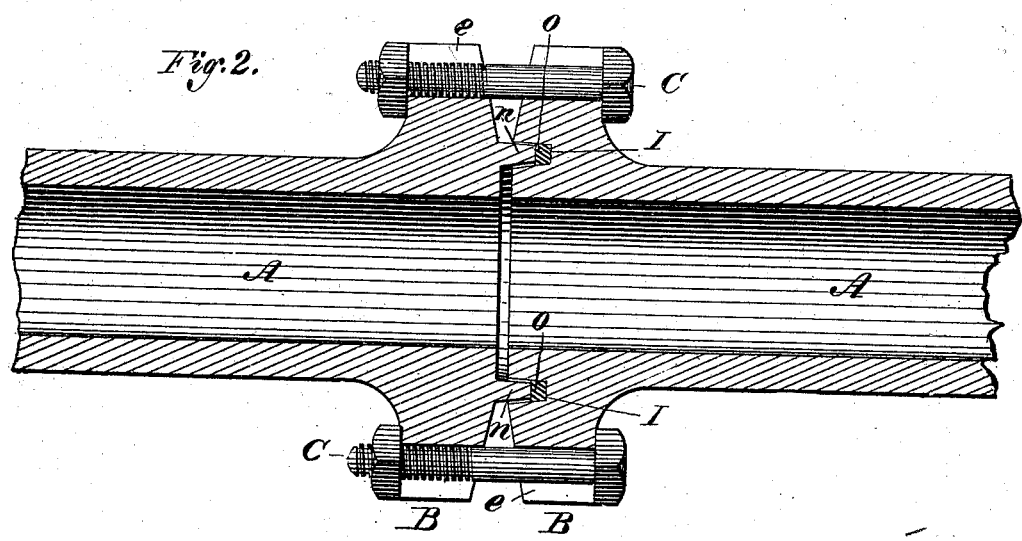
Figure 3:
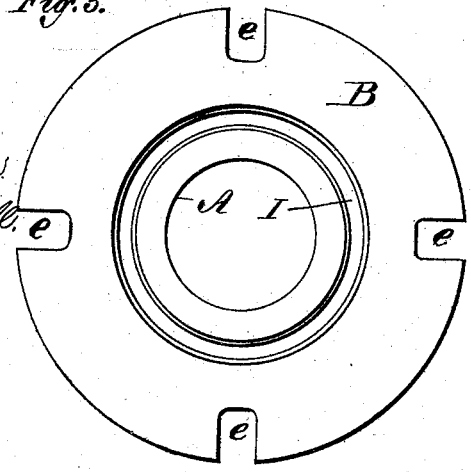

Figure 1 is a side elevation, Fig. 2 a longitudinal section, and Fig. 3 an end view, of a pipe constructed on my plan.

It has long been customary to use cast-iron pipes for conveying water and gas; and similar pipes are also used for hot water, and also steam, in heating houses for the propagation of plants and the like purposes. Many plans have been devised for uniting such pipe so as to make a tight joint, but all more or less objectionable, especially where it is desired, for any reason, to separate and reunite the joints or pieces of the pipe. To obviate the existing objections, and produce a simple, efficient, and durable joint, is the object of my present invention.

In the drawings, A represents the adjoining ends of two sections of pipe embodying my invention.

The pipe A is made with an annular groove, I, in one end, and a corresponding flange or annular tongue, n, on the other end, as shown in Fig. 2, both the groove and flange being preferably slightly beveled, as shown. Each end of the pipe A is also provided with a laterally-projecting flange, B, which has four or more slots, e, in its periphery, at uniform distances apart, as shown in Fig. 3; or, instead of the continuous flange, it may have a series of lugs formed on it, they having the slots e formed in them the same as in the flange.

In laying or putting together this pipe I provide a leaden ring, o, of the proper size to fit in the groove I, as shown in Fig. 2. After inserting this leaden ring o, the annular tongue n of the adjoining piece or section of pipe is pressed into the groove I so as to bear on the lead therein, when the parts are securely fastened together by bolts C inserted in the slots e, as shown in Figs. 1 and 2. By screwing up the nuts on these bolts the ends are brought together with sufficient force to cause the tongue n to seat itself upon the lead o at all points, and at the same time press the lead firmly into the groove. As the lead is a soft ductile metal, it is thus made to fill every crevice, and fit itself to every irregularity in the tongue and groove, thus making a tight joint.

The advantage of this plan over that ordinarily practised where molten lead is run into the joint, is that it saves much time and labor; does away with the necessity of a fire and calking with yarn and clay to hold the molten lead when poured in, and afterward upsetting or calking it with a hammer, which, from the nature of the case, is a tedious and difficult operation. Moreover, the molten lead shrinks in cooling, thereby tending to leave the joint more or less open, and rendering it uncertain as to whether it will be tight when finished.

While I prefer this method of packing the joint by means of the leaden ring, it is obvious that rubber packing-rings may be used, especially in the medium or smaller sized pipes; and that with the smaller sizes, if pains be taken to make the groove and tongue very true and accurate, rubber cement will suffice for the packing.

The object of providing slots instead of holes in the flanges B for the bolts is that they may be more readily removed when it is desired to separate the sections of pipe. When bolts are inserted in holes, they and their nuts soon become so rusted that they can only be removed by cutting off one or the other, which is a slow and difficult task, especially when the pipe is laid in the earth. By this plan the bolts can be readily driven or pried out of the slots, and the pipe taken apart at once.

By this method of construction I am enabled to produce a pipe which can be rendered tight in the joints, and which can be put together and taken apart with far less time, labor, and expense than that ordinarily used.

I am aware that there has been described a pipe-coupling in which there was shown right-angled shoulders abutting against each other, and in which there was also shown an annular groove having a rubber ring inserted with a tongue much narrower than the groove bearing against the same; but such a joint is not adapted to be used with a lead packing like mine, because the lead would be forced out at the openings in the joint, and I do not claim such; but Having described my improvement, what I claim is—

A pipe-coupling consisting of the beveled groove I and tongue n, formed on the abutting ends of the pipes A A, for the secure holding of the packing-ring o, said pipes being provided with the slotted flanges B, for the ready insertion and removal of the bolts, all constructed to operate substantially as shown and described.

WILLIAM H. VICK.

Witnesses:
A. H. SARGENT,
B. C. WILLIAMS.